United States Patent [19]

Poerink

[11] 4,410,083

[45] Oct. 18, 1983

[54] WIRE-NETTING CONVEYOR BELT, AND METHOD OF MAKING SUCH WIRE-NETTING CONVEYOR BELT

[76] Inventor: Jannes J. Poerink, Prins Bernardlaan 25, Borne, Fed. Rep. of Germany

[21] Appl. No.: 255,296

[22] Filed: Apr. 17, 1981

[30] Foreign Application Priority Data

Apr. 21, 1980 [DE] Fed. Rep. of Germany ....... 3015228
Nov. 10, 1980 [DE] Fed. Rep. of Germany ....... 3042346

[51] Int. Cl.³ .......................................... B65G 17/06
[52] U.S. Cl. .................................................. 198/853
[58] Field of Search ............... 198/853, 852, 848, 849, 198/850, 851, 831

[56] References Cited

U.S. PATENT DOCUMENTS 1,861,840 6/1932 Claghorn ........................... 198/848

FOREIGN PATENT DOCUMENTS 1602634 3/1970 Fed. Rep. of Germany ...... 198/853

Primary Examiner—Joseph E. Valenza
Assistant Examiner—Jonathan D. Holmes
Attorney, Agent, or Firm—Fitch, Even, Tabin & Flannery

[57] ABSTRACT

In the present wire-netting conveyor belt, links bent in a meander shape and extending perpendicular with respect to the direction of belt travel are interconnected by transverse rods or bars (4). The links comprising longitudinal webs or legs (1) which extend under a small angle with respect to each other and transverse legs (2) of equal length each, include facing ends looped around said transverse bars (40) by an angle of 180°, preferably more than 270°. The length of said transverse legs (2) is smaller than the average spacing of said longitudinal legs (1), this feature being utilized in assembling on said transverse rods (4) to provide a pretension or bias compensating for wear.

3 Claims, 5 Drawing Figures

WIRE-NETTING CONVEYOR BELT, AND METHOD OF MAKING SUCH WIRE-NETTING CONVEYOR BELT

The present invention relates to a wire-netting conveyor belt comprising integral belt elements or links bent in a meander-shape and extending tranversely of the belt travel direction and including adjacently positioned longitudinal webs or legs and serially positioned transverse webs or legs, wherein the facing ends of said links are connected to transverse rods or bars extending perpendicular relative to the direction of belt travel!. Further, the present invention relates to a method of making such wire-netting conveyor belt.

Wire-netting or braided conveyor belts of the type as manufactured by the applicant have been known for long time. In these structures, coiled springs are positioned between the separate eyes on the transverse rods or bars, which springs are compressed when the eyes are mounted onto the transverse bars. In this manner, it is possible to compensate for wear produced in operation of the belt, and to secure contact of the terminal or end elements with the guide ways or ends of the transverse bars. Therefore, belts of this type travel in definite paths substantially without being affected by wear; this means, the belts may be subjected to high loads.

However, it is disadvantageous in belts of the type described above, that production thereof is expensive because both the individual eyes and the separate coil springs must be manually slid onto the transverse bars. Thus, these belts are rather expensive.

Still further, a wire-netting conveyor belt is known (German Utility Model 72 36 077.1) which uses, for conveying baker's goods through a high frequency-operated baking oven, a belt having integral elements or links comprising parallel longitudinal webs or legs and serially extending transverse webs or legs. For mounting the transverse bars, the ends of the longitudinal legs are formed so as to be partially looped around the transverse bars. However, this conventional segmented conveyor belt suffers from the drawback that in order to allow the links to be slid or fitted into each other, adjacently positioned transverse legs must be of different lengths. More particularly, this means that the transverse legs of one row (line), e.g. the legs leading in the direction of travel of the belt, must be longer than the legs of the row trailing in the direction of belt travel. It is only in this manner that it becomes possible to slide the links into each other.

It is of disadvantage in a belt of this type that a bending machine operative to successively bend webs of the leading and trailing rows, is required to bend webs of different lengths in such operation. A bending machine of this kind, if it can be realized at all, could be built at high cost only, and it would be susceptible to trouble owing to its complicated construction, while providing low productivity only. Accordingly, it may be safely assumed that a belt of the above-described type cannot be realized. The above prior art may be considered as purely theoretical. In particular, a belt of this type would not allow to compensate for wear; furthermore, it would be difficult or even not feasible to provide for positive travel within the guideways.

Now, it is the object of the present invention to provide a conveyor belt of the type as outlined at the beginning, which is free from the abovementioned drawbacks and which is particularly suited for manufacture in a highly economical manner. This belt should allow to positively compensate for wear produced in operation, and the elements or links should adapted to be definitely guided.

Especially, the production of the links of the conveyor belt is contemplated to be made on a bending machine of uncomplicated construction which does not tend to cause trouble, and a high rate of production should be feasible even with the use of high-quality wire materials. Still further, the belt according to the invention is intended to run with low noise generation, without causing trouble or failure and with a minimum of driving energy required.

According to the invention, this object is solved in that said longitudinal legs extend (diverge) under a slight angle with respect to each other, that the length (L) of said transverse legs is smaller than the average spacing (M) between the respective longitudinal legs, and that said links are assembled on the transverse bars under a pretension or bias in the longitudinal direction of said transverse bars.

In order to facilitate assembling of the belt while simultaneously providing for compensation of wear produced in operation, preferably the difference between the length of the transverse legs and the average spacing of the longitudinal legs may be between 0.1 and 0.5 mm, but advantageously 0.2 mm. Preferably, the transverse legs are formed of an arc or bight interconnecting said longitudinal legs, said transverse legs not having any linear (straight) portion. This configuration of the wire netting is less costly in production because one bending operation at each transverse leg can be omitted.

In accordance with a preferred embodiment of the invention, it is contemplated that the looping angle of the ends of said longitudinal legs with respect to said transverse bars is greater than 180 , preferably greater than 270°.

Preferably and in accordance with the present invention, the wire-netting conveyor belts are manufactured in such a manner that the links are slid onto said transverse rods or bars in a relaxed state and subsequently, in order to obtain said pretension or bias, urged against each other across a distance corresponding to the product of the number of transverse legs of one row and the difference (M) in length between the average spacing of said longitudinal legs and the length of said transverse legs.

Obviously, manufacture of the wire-netting conveyor belt according to the present invention is extremely easy because in addition to the automatic production of the endlessly formed meander strip and the automatic cutting thereof to size thereof to form links, it is only the sliding of the links onto the transverse bars or rods and the adjustment of the pretension or bias that has to be effected manually. In view of the fact that the transverse bars are of identical length each, the corresponding bending machine likewise may be of extremely simple construction; this bending machine may be of uncomplicated design so as to operate reliably and at high production rates, such that it may be spoken of an ideal solution to the existing problems. In this connection, it should be particularly noted that any wear is compensated for by the pretension or bias, and the individual links are prevented from shaking, i.e. "tumbling" to and fro. Accordingly, the links always move in definite paths within the guideways, and processing by skilled workers is not necessary. These advantages result particularly from the fact that the ends of the longitudinal legs are pushed together by the transverse legs when the pretension is applied, whereby the longitudinal legs are imparted a certain degree of bending tension or flexure so that, when wear occurs, these legs compensate for such wear by tending to return into their original positions.

Below, preferred embodiments of the present invention are described in greater detail by referring to the accompanying drawings, wherein.

As shown in the Figures, the wire-netting conveyor belt according to the invention comprises side-by-side (adjacently) disposed meander-shaped strips (sectors) of integrally formed longitudinal and transverse webs or legs 1 and 2 the facing ends of which are interconnected by transverse bars or rods 4 extending transversely with respect to the direction of belt travel. The ends of the tranverse bars are provided with flanges 5, washers or other suitable elements for retaining the links, and they are guided in guideways, in well-known manner. These guideways, same as the driving pulleys of the belts are of conventional structure and, therefore, need not be described in any greater detail.

Figure 1:
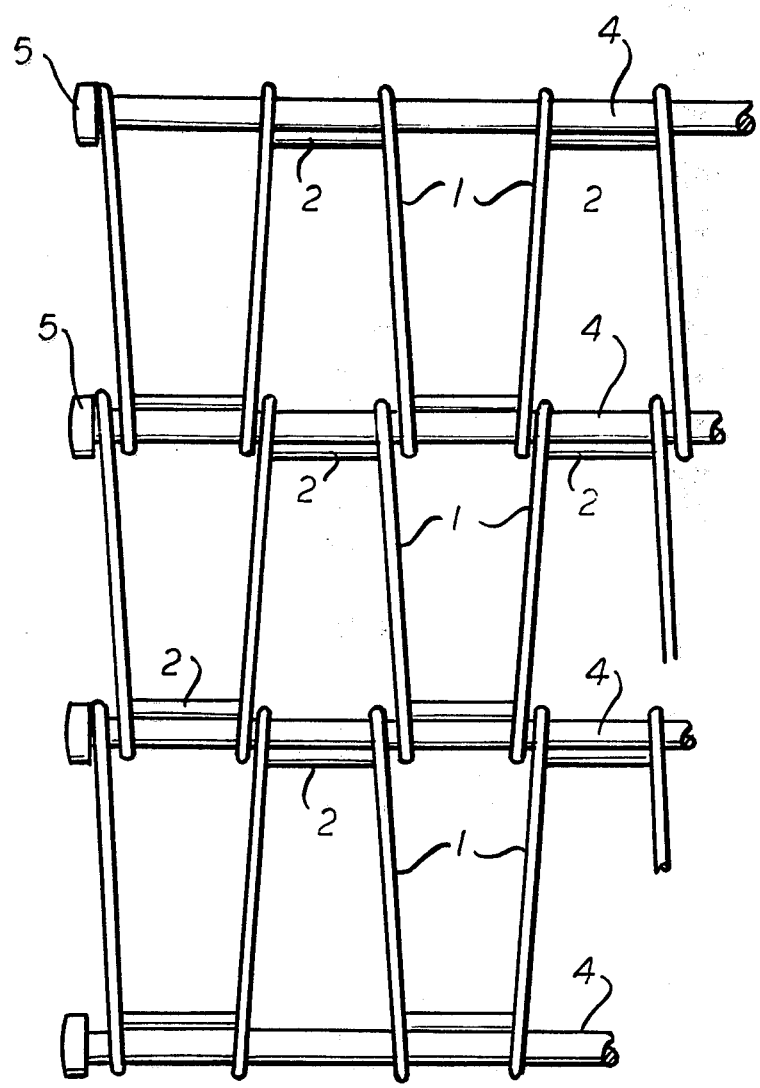
FIG. 1 is a part plan view of a first embodiment of a wire-netting conveyor belt.
Figure 2:
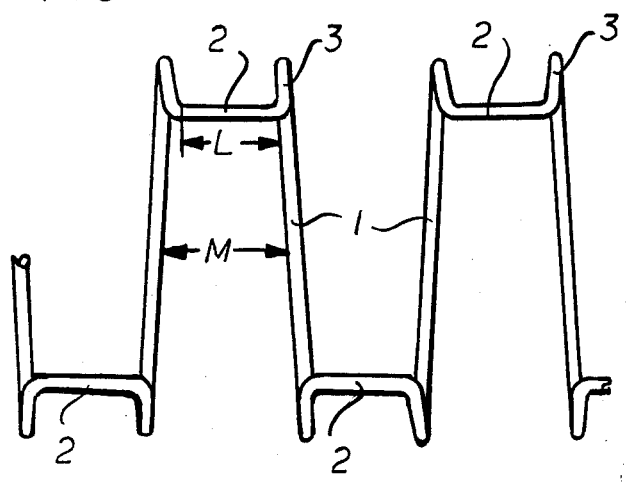
FIG. 2 is a part view of the lower side of a meander-shaped link or belt element.
Figure 3:
FIG. 3 is a cross-sectional view of one of the meander-shaped links.

The individual links of the belt are of a configuration in which the longitudinal webs or legs 1 extend (diverge) under a small angle relative to each other, and their ends, by forming eyes, are looped around the transverse bars 4 by an angle of more than 180°, preferably about 270°. Intermediate the ends of the longitudinal legs, the transverse legs 2 extend across a length of L (according to FIG. 2), as measured between the inner edges of the longitudinal legs 1 each. As the longitudinal legs 1 extend (diverge) under a given angle so as to converge towards their connecting transverse leg 2 and to define at the side opposite said transverse leg an opening for receiving the transverse leg-side of the adjacent link, these longitudinal legs define an average spacing M which exceeds the length L of the tranverse legs 2.

According to the invention, the aforesaid excess length is between 0.1 and 0.5 mm, but preferably 0.2 mm. In this structure, the openings formed for sliding in the adjacently positioned ends of the links are of a size equal to twice the difference between the average spacing M and the length L of of the transverse legs.

Figure 4:
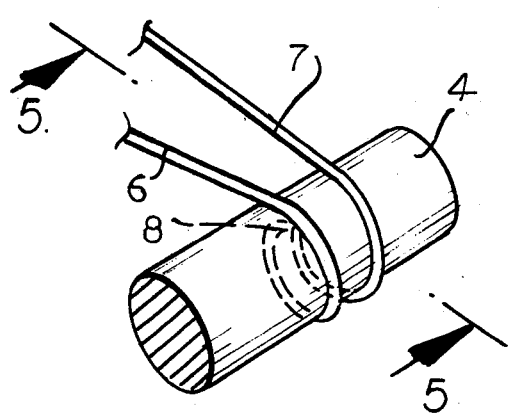
FIG. 4 is a perspective view of a modified embodiment of a link.
Figure 5:
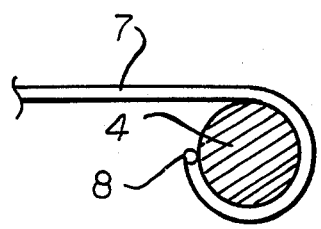
FIG. 5 is a sectional view along lines V—V in FIG. 4.

FIGS. 4 and 5 illustrate a modified embodiment of the links of the conveyor belt in which the spacing between the longitudinal legs 6 and 7 is smaller because these legs are interconnected by transverse legs 8 which are formed by the bent (bight) portion between the longitudinal legs 6 and 7 and which do not have any linear portion. In this embodiment, too, the ends of the longitudinal legs 6 and 7 are looped around the transverse bars 4 by more than 180°, preferably about 270°.

The belts according to the invention are manufactured as follows: Upon bending of the wire supplied through a reel in the bending machine, the thus formed meander-shaped strips or sectors are cut to length and thereafter slid onto the transverse bars. Upon compression of the links to apply the pretension (bias), the free ends of the transverse bars are provided with abutments in order to prevent expansion of the links; then, the belt may be put into operation without any further measure, to thereby provide the above discussed advantages which are maintained even after an extended period of operation. In particular, irrespective of the simple construction and the easy assembly, it is ensured that wear is compensated for, such that the abovementioned low-noise operation, the reliability in operation, the low driving power and the low trouble incidence are secured.

What we claim is:

1. A wire-netting conveyor belt comprising, a plurality of transversely extending rods extending transversely of the longitudinally direction of conveyor travel, said rods being spaced apart longitudinally at predetermined equal intervals, a plurality belt elements extending between and connected to adjacent transverse rods, said belt elements being formed of bent wire having integral longitudinal legs extending longitudinally between adjacent rods with adjacent pairs of legs being angled to diverge in opposite directions relative to the longitudinal direction, said belt elements having integral transverse legs extending transversely of and joined to a pair of longitudinal legs, said transverse legs being bent into an eye with a looping angle about one said transverse rods to connect the rods and belt elements, said eyes of said transverse legs having a portion extending parallel to the transverse bar and of a greater length than twice the thickness of the wire of said belt element, the length of said eye including the parallel portion being smaller than the average spacing between respectively adjacent longitudinal legs at the center portions thereof, and means at the ends of said rods holding links assembled under resilient compression between opposite side of the conveyor.

2. The wire-netting conveyor belt according to claim 1, characterized in that the difference between the length of said transverse legs and the average spacing of said longitudinal legs is between 0.1 and 0.5 mm.

3. The wire-netting conveyor belt according to claim 1 characterized in that the looping angle with respect to said transverse bars is greater than 180°, and is preferably greater than 270°.

* * * * *